United States Patent [19]

Johnson

[11] 4,253,262

[45] Mar. 3, 1981

[54] ICE FISHING TIPUP

[76] Inventor: Charles H. Johnson, Box 332, Plainfield, Wis. 54966

[21] Appl. No.: 51,146

[22] Filed: Jun. 22, 1979

[51] Int. Cl.³ .............................................. A01K 97/01
[52] U.S. Cl. .......................................... 43/17; 43/19.2
[58] Field of Search ......................... 43/4, 16, 17, 19.2

[56] References Cited

U.S. PATENT DOCUMENTS

| | | | |
|---|---|---|---|
| 1,173,827 | 2/1916 | Marsh | 43/17 |
| 2,883,784 | 4/1959 | Obernolte | 43/4 |
| 3,010,238 | 11/1961 | Crumrine | 43/16 |
| 3,352,048 | 11/1967 | Fleming | 43/17 |
| 3,545,118 | 12/1970 | Stelmach | 43/17 |
| 4,033,062 | 7/1977 | Denecky | 43/19.2 |

*Primary Examiner*—Nicholas P. Godici
*Attorney, Agent, or Firm*—Andrus, Sceales, Starke & Sawall

[57] ABSTRACT

The ice fishing tipup includes a heated flotation member which can be a bowl-like member. A vertically extending tubular member is supported by the bowl-like member and a rotatable shaft is disposed therein. A fishing line spool is carried on the lower end of the shaft beneath the bowl-like member and is rotatable with the shaft to play out fishing line. A trip lever is carried at the upper end of the shaft above the bowl-like member and is rotatable with the shaft. Signal means are provided on the tubular member and are releasably engageable with the trip lever. The signal means serve to interrupt rotation of the trip lever to thereby set the depth of the fishing line, and is released with rotation of the shaft to indicate the playing out of fishing line. In the case of a floatable bowl-like member, combustible materials may be contained therein to generate heat upon ignition.

7 Claims, 2 Drawing Figures

ICE FISHING TIPUP

BACKGROUND OF THE INVENTION

The invention relates to a tipup for ice fishing, and more particularly to a tipup that incorporates therein heating means to prevent the fishing hole from freezing over.

In freezing weather, ice fishermen must periodically scoop ice and slush from the fishing hole to prevent the hole from freezing over. That chore is a bit of a nuisance and generally requires the fishing line and tipup to be disturbed, sometimes perhaps at an inopportune moment. It is generally an object of this invention to incorporate heating means into an ice fishing tipup and thereby generally prevent the fishing hole from freezing over.

SUMMARY OF THE INVENTION

Generally the ice fishing tipup of this invention contemplates a float means which can take the form of a bowl-like member. A vertically extending tubular member is disposed generally centrally of the bowl-like member and projects above and beneath the bowl-like member and is sealingly connected to the bowl-like member. A shaft is rotatably disposed generally centrally of the tubular member. A fishing line spool is carried on the lower end of the shaft and is rotatable with the shaft to play out fishing line. A trip lever is carried at the upper end of the shaft and is rotatable with the shaft. Signal means are carried on the tubular member and are releasably engageable with the trip lever. When engaged with the trip lever, the signal means serves to interrupt rotation of the trip lever and thereby sets the depth for the fishing line. The signal means are releasable from the trip lever with rotation of the shaft to indicate the playing out of the fishing line and hopefully a potential catch. The float means are heated to generally prevent a freezing up of the fishing hole, and in the case of a floatable bowl-like member, combustible materials may be contained therein to generate heat upon ignition.

DESCRIPTION OF THE DRAWING FIGURES

The drawings furnished herewith illustrate the best mode presently contemplated for the invention and are described hereinafter.

In the drawings:

FIG. 1 is a side elevation of the ice fishing tipup of this invention with parts broken away and sectioned and showing the signal means engaged with the trip lever and in dotted lines showing the signal means in the disengaged position; and FIG. 2 is an enlarged partial plan view of the tipup shown in FIG. 1.

DESCRIPTION OF THE ILLUSTRATED EMBODIMENT

Figures 1, 2:
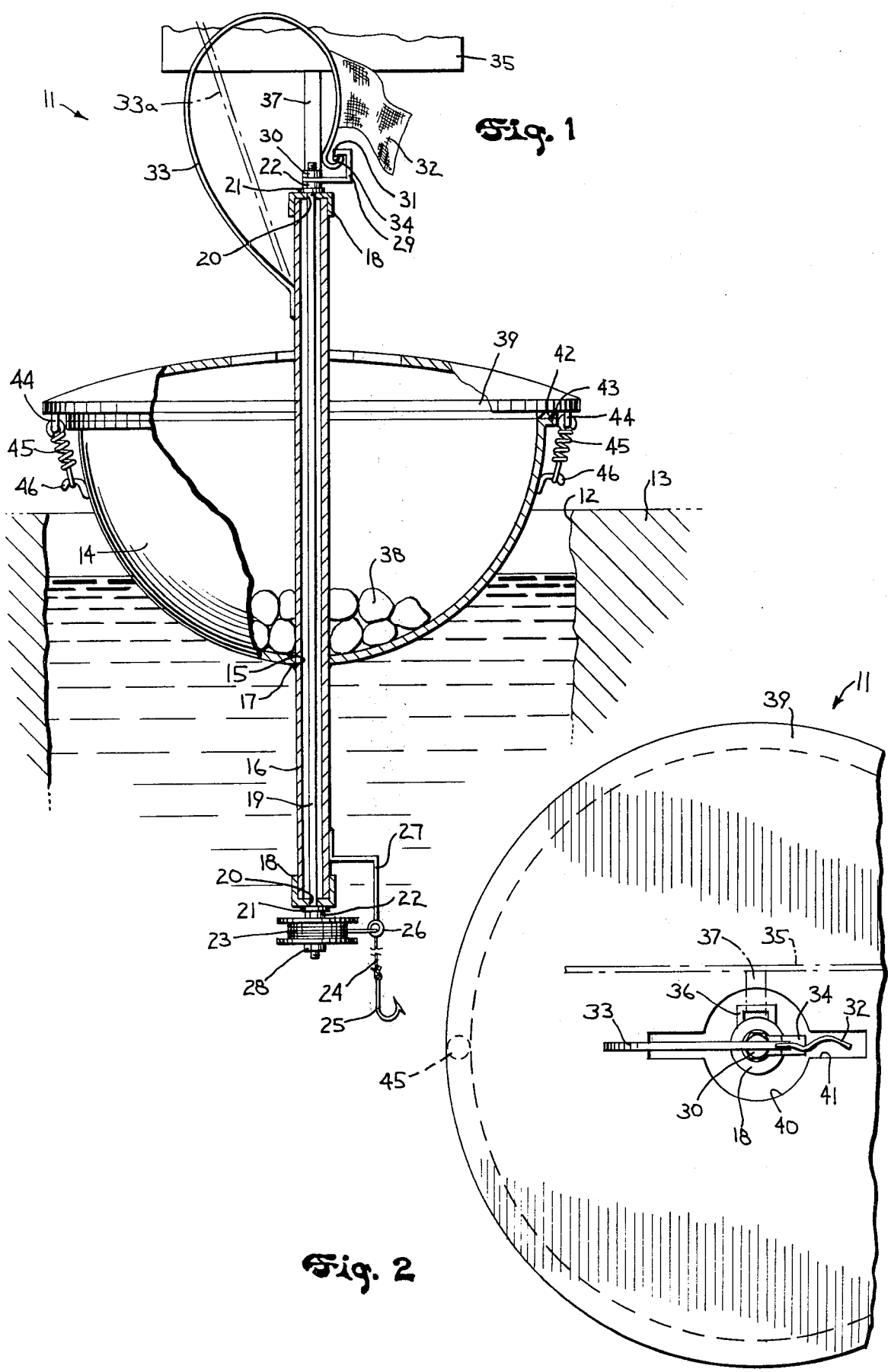

Referring to the drawings, the fishing tipup 11 of this invention for fishing through a hole 12 in the ice 13 generally includes a float in the form of a bowl-like member 14 having a hole 15 centrally thereof. A hollow tube 16 extends vertically through the hole 15 of the bowl-like member 14 and is sealingly connected to the bowl-like member as by the weld 17 at the hole.

The tube 16 projects above and beneath the bowl-like member 14 and is provided with an end cap 18 at the respective ends thereof. A shaft 19 is disposed generally centrally of the tube 16 and projects therefrom through the openings 20 in the respective end caps 18. The shaft 19 is rotatable relative to the tube 16 as provided for by the opposed thrust washers 21 and is secured axially relative to the tube by the opposed nuts 22 bearing on the respective washers.

Beneath the lower end of the tube 16, a spool 23 is fixed on the shaft 19 and rotates therewith to play out or wind in the fishing line 24 provided with at least one fishing hook 25 on the end thereof. The fishing line 24 passes through the eye 26 of the line guide 27 which is fixed on the tube 16 intermediate the bowl-like member 14 and the lower end cap 18. The spool 23 is secured onto the shaft 19 between the nut 22 and the lower lock nut 28.

The upper end of the shaft 19 carries a radially extending trip lever 29 which is fixed onto the shaft between the nut 22 and the upper lock nut 30. The lever 29 includes an upwardly extending portion and a reverse bend portion that terminates with a downwardly extending hook 31 which is spaced from the centerline of the shaft 19.

A signal flag 32 is carried adjacent to the free end of a spring member staff 33 secured to the outside of the tube 16 intermediate the bowl-like member 14 and the upper end cap 18. The spring member staff 33 normally extends angularly relative to the tube 16 in its released condition as shown by its dotted line position 33a. In its released condition, the spring staff 33 provides for free rotation of the trip lever 29 with rotation of the shaft 19. The upper end of the spring member staff 33 terminates with a hook 34 which upon arching of the staff is engageable under the hook 31 of the trip lever 29 when the lever extends to the opposite side of tube 16 from the flag staff mounting as perhaps best shown in FIG. 1.

The ice fishing tipup 11 is also provided with a removable wind vane 35 which may be utilized if desired, to provide for rocking of the tipup and thereby move and/or bob the baited fish hook 25 when wind conditions permit. The vane 35 is carried on a staff 36 the lower end of which is insertable in the pocket 37 provided on the side of tube 16 generally normal to the trip lever 29 when in position for engagement by the flag staff 33. The staff 36 of the vane 35 is outwardly offset intermediate its length so that neither the wind vane nor its staff will interfere with the free rotation of the trip lever 29 or operation of the signal flag 32 and its spring staff 33.

When undertaking to fish through a hole 12 in the ice 13, the bowl-like member 14 of the tipup 11 is at least partially filled with a solid combustible material 38, such as charcoal, which is ignited to generate heat and thus provide for a substantial period of fishing time during which the hole through the ice is maintained substantially free of slush and from freezing over. To permit generally rough handling, as when a fish is hooked and the tipup 11 must be quickly removed from the hole 12 to expose the fish line 24 for manual manipulation and to hopefully land the fish, a cover 39 is provided for the bowl-like member 14 to generally preclude spillage of the burning material 38. The cover 39 may be crowned so that water and/or melted ice and snow will roll therefrom to prevent their accumulation and possible dripping onto the burning fuel.

To provide air for combustion of the material 38 and to pass over the tube 16, the cover 39 is provided with a generally circular hole 40 centrally thereof. The hole 40 is enlarged by the diametrically extending slot 41 which is sufficiently long to easily pass the disengaged signal flag 32 and its staff 33 as well as the trip lever 29. A suitable annular gasket 42 is interposed between the lip 43 at the upper edge of the bowl-like member 14 and the cover 39.

The diameter of the cover 39 exceeds that of the lip 43 of member 14 at least in the diametral vertical plane of the slot 41. The underside of the cover 39 outwardly of the lip 43 is provided with diametrically opposed mounting projections 44 for receiving one end of a coil spring 45. When the cover 39 is assembled onto the bowl-like member 14 with the slot 41 aligned to pass over the signal flag 32 and the trip lever 29, the respective springs 45 will be generally aligned relative to corresponding hooks 46 provided on the outside of the bowl-like member. The lower ends of the springs 45 are engaged over the hooks 46 to sealingly clamp the cover 39 onto the bowl-like member 14 to generally preclude spillage of the burning material 38 when the member 14 comes to rest on its side.

In service, the combustible material 38 is ignited and the cover 39 assembled onto the bowl-like member 14. Thereafter, the fishing line 24 is played out to place the baited hook 25 at the depth desired. With the hook 25 disposed at the desired depth, further rotation of shaft 19 is interrupted and the opposed hooks 31 and 34 of trip lever 29 and signal flat staff 33, respectively, are engaged to maintain the fishing depth. If and when a fish takes and runs with the baited hook 25, fishing line 24 is played out effecting corresponding rotation of the spool 23 and shaft 19. With rotation of shaft 19, the trip lever 29 is correspondingly rotated to release the signal flag staff 33 and thereby indicate the potential catch.

While the tipup 11 is most useful for ice fishing, it can be used on open water in other seasons and without need for burning fuel.

Various modes of carrying out the invention are contemplated as being within the scope of the following claims particularly pointing out and distinctly claiming the subject matter which is regarded as the invention.

I claim:

1. In a tipup for fishing through a hole in ice, float means, a source of heat, means for applying the heat from the heat source to the float means to generally prevent the water in the fishing hole from freezing over, a vertically extending tubular member supported by the float means and projecting above and beneath the float means, a shaft rotatably disposed generally centrally of the tubular member, a fishing line spool carried on the lower end of the shaft beneath said tubular member and being rotatable with the shaft to play out fishing line, a trip lever carried at the upper end of the shaft above the tubular member and being rotatable with the shaft, and means provided on the tubular member and engageable with the trip lever to interrupt rotation of the trip lever, shaft and line spool and thereby set the fishing depth for the fishing line, said means engageable with the trip lever being releasable from said lever in response to the playing out of fishing line and rotation of the line spool as when a fish runs with the fishing line.

2. The structure as set forth in claim 1 wherein the float means comprises a bowl-like member and the tubular member is disposed generally centrally of the bowl-like member and is sealingly connected thereto, said bowl-like member being adapted to contain combustible material and serving as a heat source to generate heat upon ignition to generally prevent the fishing hole from freezing over.

3. The structure as set forth in claim 2 wherein a cover is provided for the bowl-like member, said cover being provided with a hole centrally thereof to pass over the releasable means engageable with the trip lever in its released condition, and the trip lever and the tubular member, said hole being sufficiently large to provide air for combustion when the cover is seated on the bowl-like member.

4. The structure as set forth in claim 3 wherein spring means serve to clamp the cover down onto the lip of the bowl-like member.

5. In a tipup for fishing through a hole in ice, a bowl-like member floatable on the water in the hole, a vertically extending tubular member disposed generally centrally of the bowl-like member and projecting above and beneath the bowl-like member and being sealingly connected to the bowl-like member, a shaft rotatably disposed generally centrally of the tubular member and projecting beyond the respective ends of the tubular member, a fishing line spool carried on the lower end of the shaft and being rotatable with the shaft to play out fishing line, a trip lever carried at the upper end of the shaft and being rotatable with the shaft, and signal means mounted on the tubular member and being releasably engageable with the trip lever, said signal means serving to interrupt rotation of the trip lever and shaft and line spool and thereby set the fishing depth for the fishing line when engaged with the trip lever and being releasable from the trip lever with rotation of the shaft to indicate the playing out of fishing line, said bowl-like member containing a combustible material to generate heat upon ignition to generally prevent the fishing hole from freezing over.

6. The structure as set forth in claim 5 wherein a cover is provided for the bowl-like member, said cover being provided with a hole centrally thereof sufficiently large to pass over the signal means in its released condition and the trip lever and the tubular member and to provide air for combustion when seated on the bowl-like member.

7. The structure as set forth in claim 6 wherein releasable spring means extend between the cover and the bowl-like member and serve to clamp the cover down onto the lip of the bowl-like member.

* * * * *